(12) United States Patent
Davidson

(10) Patent No.: US 6,346,881 B1
(45) Date of Patent: Feb. 12, 2002

(54) TAG EVALUATION MODULE FOR RADIO FREQUENCY IDENTIFICATION (RFID) SYSTEMS

(75) Inventor: William E. Davidson, Durham, NC (US)

(73) Assignee: Samsys Technologies Inc. (CA)

(*) Notice: Subject to any disclaimer, the term of this patent is extended or adjusted under 35 U.S.C. 154(b) by 0 days.

(21) Appl. No.: 09/516,117

(22) Filed: Mar. 1, 2000

(51) Int. Cl.⁷ .............................................. G08B 29/00
(52) U.S. Cl. ...................... 340/514; 340/933; 340/941; 340/572.1
(58) Field of Search ................................. 340/933, 928, 340/901–905, 934, 936, 941, 991, 815.54, 825.54, 825.49, 514, 572.1

(56) References Cited

U.S. PATENT DOCUMENTS

| | | | | |
|---|---|---|---|---|
| 5,552,993 A | * | 9/1996 | Buchwicz et al. | 340/825.34 |
| 5,568,512 A | * | 10/1996 | Rotzoll | 375/211 |
| 5,602,919 A | * | 2/1997 | Hurta et al. | 340/928 |
| 5,805,082 A | * | 9/1998 | Hassett | 340/928 |
| 5,847,661 A | * | 12/1998 | Ricci | 340/905 |
| 5,986,570 A | | 11/1999 | Black et al. | 340/825.54 |
| 6,052,068 A | * | 4/2000 | Price et al. | 340/933 |

FOREIGN PATENT DOCUMENTS

WO    WO00/28339    5/2000    ......... G01R/31/316

OTHER PUBLICATIONS

"Calibration Kit" IBM Technical Disclosure Bulletin, US IBM Corp. New York, vol. 39, No. 1, 1996, p. 417 XP000556451 ISSN: 0018–8689, the whole document.

* cited by examiner

Primary Examiner—Daryl Pope
(74) Attorney, Agent, or Firm—Dinesh Agarwal, P.C.

(57) ABSTRACT

Apparatus and method of evaluating and installing a wireless system, and is suited for a radio frequency identification (RFID) system. The apparatus determines the suitability of a particular site for use with specific RFID tag types. The apparatus comprises a tag evaluation module having a drobe, a wireless transmitter, and a processor. The probe is coupled to a tag under evaluation and information, such as tag power and data, is collected and stored by the processor. The information may be processed into logs which are transmitted to a computer for further processing. The tag evaluation apparatus may be utilized as a site survey tool before installation of a RFID system, or after installation as a diagnostic or performance optimizing tool.

18 Claims, 5 Drawing Sheets

TAG EVALUATION MODULE FOR RADIO FREQUENCY IDENTIFICATION (RFID) SYSTEMS

FIELD OF THE INVENTION

The present invention relates generally to radio frequency identification (RFID) systems, and more particularly to apparatus for evaluating radio fequency identification systems.

BACKGROUND OF THE INVENTION

Radio frequency identification (REID) systems are known systems which allow objects to be labeled with tags such that when the tag is passed through the electromagnetic field of a reader/interrogator the object is identified by reading the tag attached to he object.

The tag includes an antenna, which may be a dipole for far field systems or a coil for inductive systems tuned to the frequency of the interrogator's generated electromagnetic field. The electrical current generated in the tag's antenna powers the tag. Data is generally sent to the tag by modulating the interrogator generated electromagnetic field which is commonly called the exciter or illuminating field. The tag sends data back to the interrogator either by transmitting with its own transmitter with a separate frequency and antenna from the illuminating field or by modulating the illuminating field by changing the loading of the tag's antenna in what is commonly called a back scatter system. In any case, either the new electromagnetic field from the tag or the disturbances in the interrogator's illuminating field caused by the tag's back scatter system is detected by the interrogator. The data from the tag is decoded, thereby enabling the tag and the item to which the tag is attached to be identified. In some cases the tag is written to, as in the case of read/write tags, by modulating the interrogator's generated electromagnetic field. Typical information that might be stored on the tags includes: purchase order number (i.e. PO#); expire date; destination; confirmation of an applied process, etc.

With a RFID system, or other types of wireless installations, the location for the installation must be checked for suitability. This is especially true for automated RFID tag systems since the tags are generally mounted on objects that are being moved through the interrogation field of a reader which is fixed. The other possibility is where the tagged objects are not moving i.e. on storage shelves, and the reader is moving, for example the reader is mounted on a forklift. In either case the dynamics between the reader and the tags are changing and it is difficult to characterize the coverage of the RF field, because of interference to other equipment and interference from other equipment.

One known method for evaluating a site and tag equipment involves using test equipment to characterize existing radiation at the site and mapping the power levels from the tag equipment. While this testing procedure does provide good diagnostic information for determining causes of problems with existing installations, there are a number of shortcomings. The principal problem with this approach is that the test equipment required to perform, the evaluation is expensive and requires a very skilled and experienced technician. It is also difficult and inaccurate to convert these results into appropriate range and accuracy figures for the operation of the RFID system. Furthermore, the results are not representative of actual operating conditions with moving tags and readers.

A second known method in the art involves installing a pilot system and allowing the system to operate for a period of time all the while collecting statistical data on its performance. While this approach produces actual operating conditions, it is expensive in terms of equipment, is logistically difficult to set,o, and is slow to produce results. It is generally considered a "go/no go" type of evaluation and must be run for a very long time collecting statistics in order to characterize any marginal conditions. It 's therefore not useful for determining actual installation positions or for diagnosing the reasons why a site is good or bad.

In view of the shortcomings with the prior art techniques, there still remains a need for RFID survey tools and techniques.

SUMMARY OF THE INVENTION

The present invention provides an apparatus and method for evaluating and installing a wireless system and is Particularly suited to radio fequency identification (RFID) systems. The tag evaluation apparatus and method determine the suitability of a particular site for use with specific identification tag types. The tag evaluation apparatus may be utilized before installation as a site survey tool or after installation as a diagnostic or performance optimizing toot.

In accordance with the present invention, the power levels on actual tags are measured for the communications in and out of the tags and are compared with the communications from the interrogator. The RFID tag evaluation apparatus provides the capability or different tag types to be evaluated in actual use on the items to be tagged while the tag item (or tag items) is being transported in the operational mode. The RFID tag evaluation module measures and records the key parameters for operation of an RFID tag system in real-time, and is capable of highlighting marginal areas. As such, the system is suitable for evaluating and determining antenna placements and diagnosis of existing systems.

In a first aspect, the present invention provides apparatus for evaluating a radio frequency identification system having a plurality of tags, said tags operating at a selected frequency, and said tags being responsive to an output signal transmitted by an interrogator and including a circuit for receiving the output signal transmitted by the interrogator and transmitting a return signal in response to said output signal, said evaluation apparatus comprising: (a) a probe for coupling to the circuit in one of said tags, and said probe including a plurality of lines for sampling selected signals in said circuit; (b) a controller coupled to said probe and including a processor for processing said sampled signals and memory for storing information associated with said sampled signals; and (c) a transmitter coupled to said controller and responsive to control signals from said controller for transmitting said stored information to a remote device, wherein said transmitter utilizes a communication channel operating at a different frequency than the selected frequency for the tags.

In another aspect, the present invention provides apparatus for evaluating a wireless system having a plurality of wireless terminals, the wireless terminals operate at a selected frequency, and the wireless terminals are responsive to an output signal transmitted by a transceiver terminal and each of the wireless terminals includes a circuit for receiving the output signal transmitted by the transceiver terminal and transmitting a return signal in response to the output signal, the apparatus comprises: (a) a probe for coupling to the circuit in one of the wireless terminals, and the probe includes a plurality of lines for sampling selected signals in the circuit; (b) a controller is coupled to the probe and includes a processor for processing the sampled signals and memory for storing information associated with the sampled signals; and (c) a transmitter is coupled to the controller and is responsive to control signals from the controller for transmitting the stored information to a remote device, wherein the transmitter utilizes a communication channel operating at a different frequency than the selected frequency for the wireless terminal.

In yet another aspect, the present invention provides a data signal embodied in a carrier wave, the data signal provides information from a tag under evaluation in a radio frequency identification system to a remote device, the radio frequency identification system includes a plurality of tags operating at a selected frequency, and the tags are responsive to an output signal transmitted by an interrogator, the data signal comprises: (a) an envelope; (b) a data portion, the data portion provides information about the tag under evaluation.

BRIEF DESCRIPTION OF THE DRAWINGS

Reference will now be made, by way of example, to the accompanying drawings, which show a preferred embodiment of the present invention, and in which.

DETAILED DESCRIPTION OF THE PREFERRED EMBODIMENT

Figure 1:
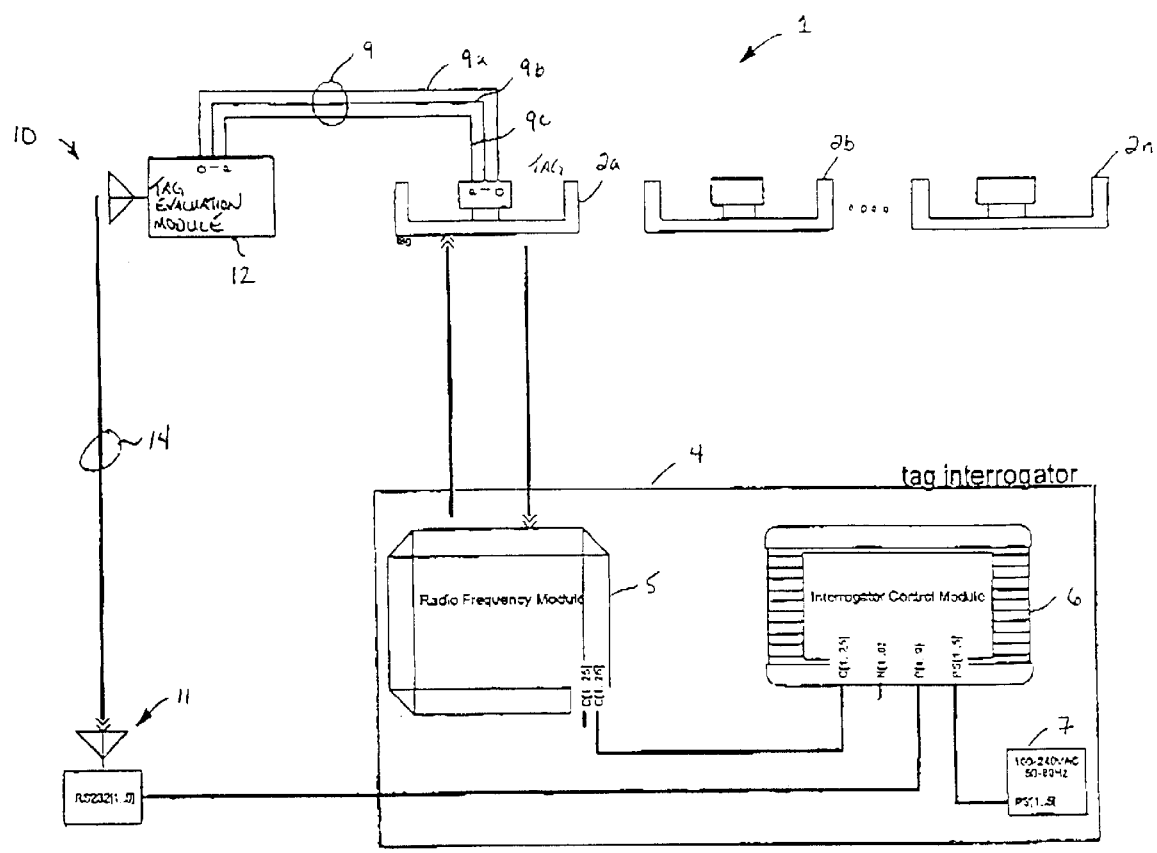
FIG. 1 shows in block diagram form a RFID survey or tag evaluation apparatus according to the present invention in a radio frequency identification (RFID) system.

Reference is first made to FIG. 1 which shows a tag evaluation module or survey apparatus 10 according to the present invention. While the apparatus and method according to the present invention are described in the context of a radio frequency identification (RFID) system, it is to be Understood that the invention has wider applicability to other types of wireless systems and installations.

As shown in FIG. 1, the tag evaluation module 10 is coupled to a radio frequency identification system or RFID system which is indicated generally by reference 1. The RFID system 1 comprises one or more tags 2, shown individually as 2a, 2b... 2n, and a tag interrogator module 4. The RFID system 1 may comprise a pre-existing installation in which case the tag evaluation module 10 is utilized as an evaluation tool to diagnose and monitor the performance of the system 1. If the RFID system 1 is a new system which is to be installed, the tag evaluation module 10 is utilized as a survey tool in conjunction with selected tags 2 to the suitability of the system 1 to the installation site. For example, the installation site is checked for coverage of the RF field, for interference to other equipment and for interference from other equipment.

The tag interrogator module 4 is similar to the arrangement disclosed and described in a co-pending United States patent application filed Jan. 6, 2000 the name of the common owner of the subject invention. The tag interrogator module 4 comprises a radio frequency module 5 and an interrogator control module 6 and a power supply unit 7. The tag interrogator module 4 both reads and writes to the tag 2a which is being evaluated.

Figure 2:
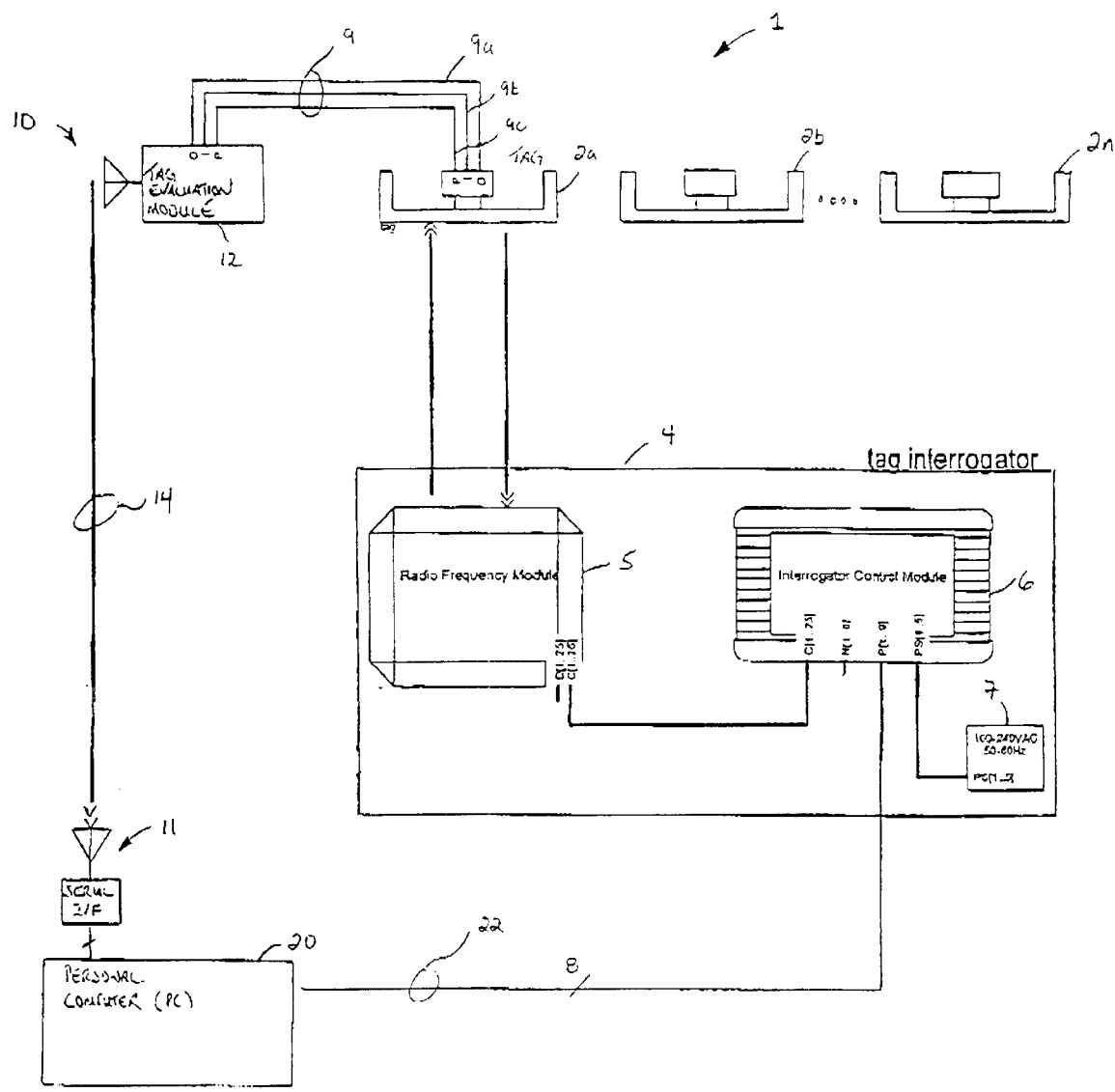
FIG. 2 shows in block diagram form a tag evaluation apparatus arrangement according to another embodiment of the present invention.

As also shown in FIG. 1, the tag evaluation module 10 includes a telemetry receiver 11. The tag evaluation module 10 is connected to the tag 2a under evaluation through very high impedance probes indicated by reference 9. The probes 9 include a tag data line 9a, a tag gap line 9b, and a tag power line 9c. The telemetry receiver 11 provides a radio frequency communication channel (denoted generally by reference 14) for the tag evaluation module 10. In one embodiment, the telemetry receiver 11 couples the tag evaluation module 10 to the interrogator control module 6 as shown in FIG. 1. In another embodiment, the telemetry receiver 11 couples the tag evaluation module 10 to a personal computer 20 as shown in FIG. 2. The interrogator control module 6 (FIG. 1) or the personal computer 20 (FIG. 2) receive through the telemetry receiver 11 the measurements made bag and the data collected by the tag evaluation module 10. This information is processed as will be described in more detail below. For the arrangement shown in FIG. 1, the tag interrogator 4 both reads and writes to the tag 2a under evaluation.

Referring again to FIG. 1, the tag evaluation module 10 preferably comprises a battery-powered device which is coupled to one of the tags 2a, i.e. the tag under evaluation. The tag evaluation module 10 includes a radio frequency communication channel which comprises a transmitter 12 and the telemetry receiver 11. The telemetry receiver 11 is connected either to the tag interrogator 4 (FIG. 1) or the personal computer 20 (FIG. 2) as described above. The telemetry receiver 11 allows the tag evaluation module 10 to communicate with the tag interrogator 4 or the PC 20 and with the radio frequency identification link between the tag interrogator 4 and the tag 2a forms a closed loop system. The radio frequency communication channel between the tag evaluation module 10 and the telemetry receiver 11 preferably utilizes a frequency which is significantly different from the operating frequency of the tags 2 and the tag interrogator 4. For instance, 315 MHz is a low power telemetry band that does not overlap with any conventional tag frequency allocations. The information collected for or processed from a tag is encoded in a radio frequency signal (i.e. carrier wave) and transmitted to the telemetry receiver 11. The encoding of the information may be performed using conventional techniques, for example, the signal comprises an envelope and an information or data portion.

It will be appreciated that the communication channel between the tag evaluation module 10 and the tag interrogator 4 or PC 20 may be implemented using other techniques, such as, a serial hardwired communication link. The telemetry implementation is preferred because it provides good maneuverability and flexible placement options for the tag evaluation module and the receiving unit (i.e. the receiver 17 and the tag interrogator module 4 and/or the PC 20). In addition, a long wire link between the tag evaluation module 10 and the tag interrogator 4 leads to signal propagation between the tag evaluation module 10 and the tag interrogator 4 which may disturb the readings.

The arrangement of the tag evaluation module 10 as shown in FIGS. 1 and 2 allows the vital system parameters of the tag 2a to be measured without disturbing its operation. This information is used to verify, quantify and qualify the operation of the tag 2a in actual use. The main system parameters are (a) power from the RF field which is used to power the RFID tag 2a, or in the case of active tags is used to identify the region of interrogation; (b) the data input interface in the tag 2a which is used to receive data from the tag interrogator 4; and (c) the data output interface in the tag 2a which is used to send data to the tag interrogator 4. The tag evaluation module 10 collects this information and data at the tag 2a and sends the information back to the tag interrogator 4 or the PC 20 via the separate radio frequency channel using the telemetry receiver 11. Since radio frequency of the telemetry channel is different than the operating frequency of the tags 2, the operation of the tags 2 is not affected. The information collected from the tag 2a by the tag evaluation monitor 10 is compared with the data sent and received by the tag interrogator module 4 and logged along with voltage reading from the tag 2a and position information at the time of the test.

If the arrangement of the separate PC 10 shown in FIG. 2 is used to collect the data, then there is preferably a communication link 22 (FIG. 2) between the PC 10 and the tag interrogator module 4. Preferably, the tag interrogator module 4 includes a screen to display instructions to RFID site survey technician which guide the technician through operations of the tag 2a and experiments such as the range and collision requirements for the application are exercised. The data collected by the tag evaluation module 10 and received via the telemetry radio frequency link 14 is matched against the data sent and received via the tag interrogator 4 operating in normal mode and again against the operation that was taking place at that point in order to characterize the applicability of that type of tag 2a in actual operating conditions at that site. This will not only give information that the tag 2a actually worked but give information on interference, error rates and give a measure as to how well or marginally the system is working.

For the arrangement with the tag interrogator module 4 shown in FIG. 1, the interrogator 4 includes a microprocessor (not shown) which is suitably programmed to compare data collected by the tag evaluation module 10 at the tag 2a with data generated and collected at the interrogator 4. For the arrangement with the personal computer 20 shown in FIG. 2, the PC 20 is connected to the tag evaluation module 10 through the telemetry receiver 11 and to the tag interrogator 4 through the communication link 22. The PC 20 is suitably programmed to perform the comparisons and logging of the data collected by the tag evaluation module 10 and the data received from the tag interrogator 4.

As will now be described with reference FIGS. 3(a) to 3(c), the tag evaluation module 10 comprises two principle sub-modules: the telemetry receiver 11 and a controller stage 12. An electronic implementation for the telemetry receiver 11 is shown in schematic form in FIG. 3(c). A circuit implementation for the controller stage 12 is shown in schematic form in FIG. 3(a), and a more detailed circuit implementation for the controller stage 12 is shown in FIG. 3(b). As described above, the tag evaluation module 10 is preferably implemented as a battery-powered device and is coupled to the tag 2a of interest.

Figure 3A:
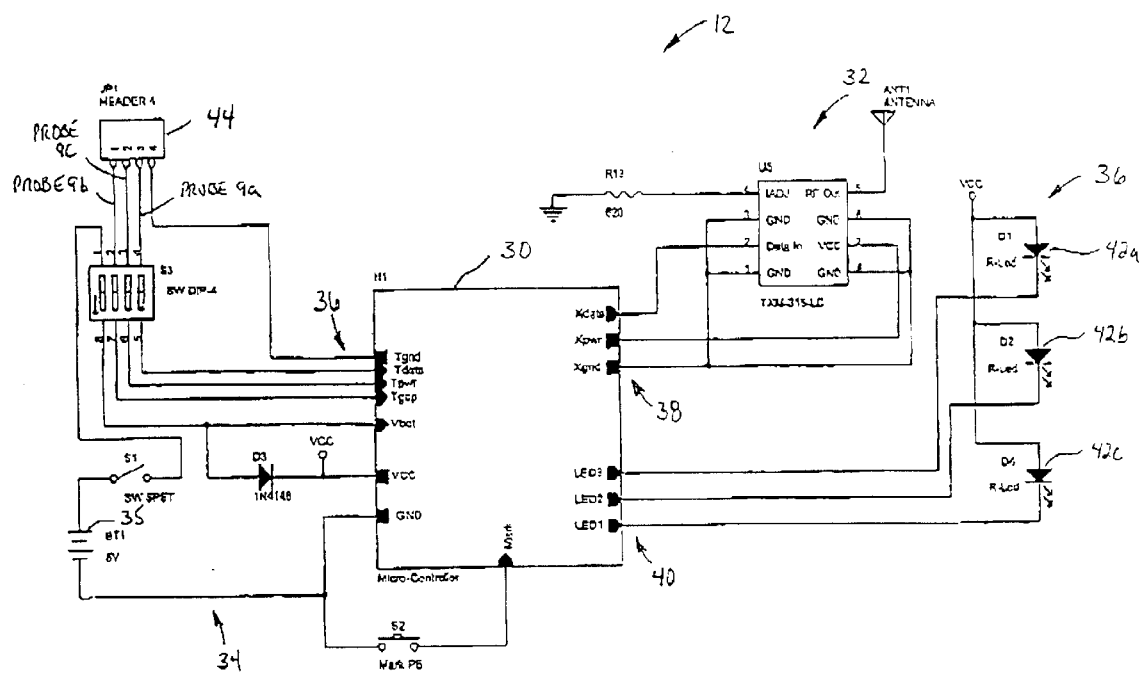
FIG. 3(a) shows in schematic form an implementation for the tag evaluation module of FIG. 1.
Figure 3B:
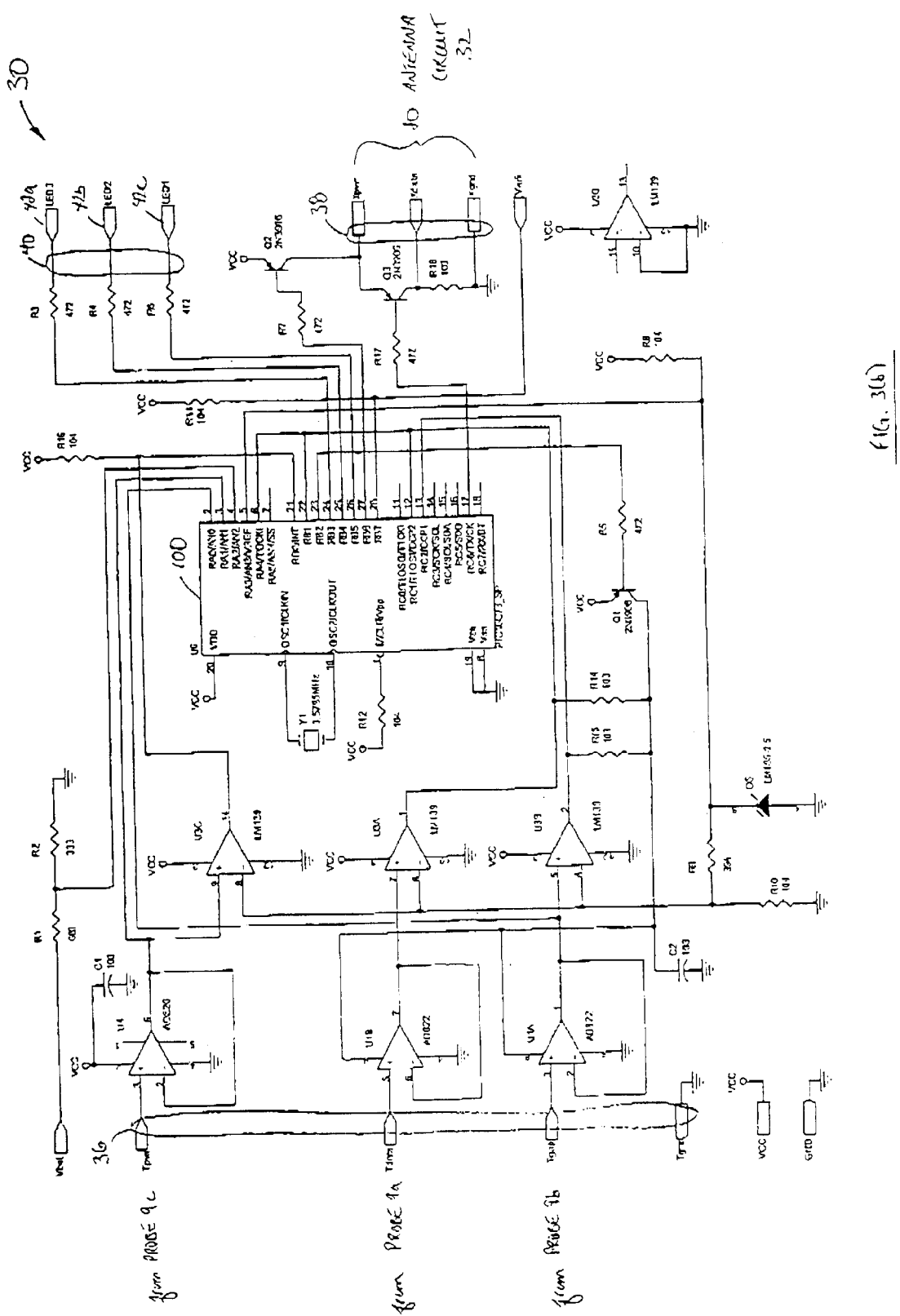
FIG. 3(b) shows in schematic form a more detailed circuit implementation for the controller module of FIG. 3(a)

Reference is next made to FIG. 3(a) which shows in schematic form an implementation for the controller stage 12 of the tag evaluation module 10. As shown in FIG. 3(a), the controller stage 12 comprises three principle components: a controller 30, an antenna circuit 32, and a battery supply circuit 34. The antenna circuit 32 provides the radio interface to the telemetry radio frequency channel 14. The controller 30 comprises a conventional microprocessor-based device 100 as shove in FIG. 3(b), such as the PIC16C73 microcontroller. The controller 30 includes local memory and provides the control and processing functions for the tag evaluation module 10. The controller 30 includes an input port 36 for receiving output signals from the tag 2a under evaluation. The input port 36 is coupled to the corresponding probe lines 9 (FIGS. 1 and 2) through a suitable connector 44. The controller 30 includes a transmit data output port 38 which is coupled to the antenna circuit 32. The controller 30 also includes an output port 40 for driving three light emitting diodes 42, indicated individually by references 42a, 42b, and 42c. The LEDs 42 are used to provide a visual indication of selected status and operational states of the tag evaluation module 10. The controller 30 is powered by a battery 35 in the battery circuit 34. The battery circuit 34 also provides power for the remainder of the circuitry in the controller stage 13. The controller 30 (i.e. microprocessor-based device 100) is suitably programmed to receive and store data and signals received from the tag 2a via the probes 9. The specific implementation details for the controller 30 will be within the understanding of one skilled in the art and further details are provided for a "PIC" microcontroller 100 implementation in the schematic diagram shown as FIG. 3(b).

Figure 3C:
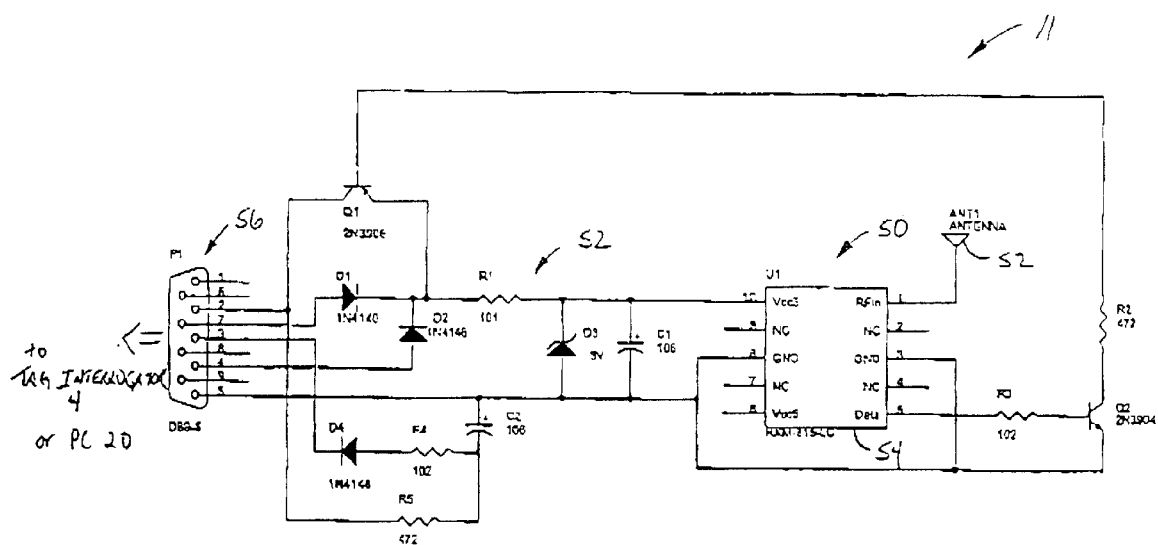
FIG. 3(c) shows in schematic form a telemetry receiver for the tag evaluation module of FIG. 1.

Reference is next made to FIG. 3(c) which shows in schematic form an implementation for the telemetry receiver 11. The telemetry receiver 11 comprises two principal components: an antenna circuit 50 and a signal conditioning circuit 52. The antenna circuit 50 includes an antenna 54 and an integrated circuit 56. A he antenna 52 receives the radio frequency signal from the controller stage 11 and feeds this signal to the integrated circuit 54. The integrated circuit 54 comprises a conventional radio transceiver device such as the RXM-315-LC, available from Linx Technologies of Grants Pass, Oreg., which converts the radio frequency signal into a series of output data pulses. The signal conditioning circuit 52 adjusts the level of the output data pulses and provides a buffer. The conditioned data pulses are then made available to the tag interrogator module 4 or the PC 20 through a suitable connector port 56. The specific implementation details of the telemetry receiver 11 as shown in FIG. 3(c) will be within the understanding of one skilled in the art.

In operation, the tag interrogator 4 is set un at the site of a proposed RFID system installation and the tag 2a is attached to a representative item (for example, a pallet containing auto parts in a warehouse) that is intended to be tagged. The site survey is then performed as follows: (1) instructions are given to the technician (or technicians) running the site survey via a screen on the tag interrogator 4 or the display on the PC 20 screen which direct the technician(s) as to the test which is to be conducted. For example, move the item with the tag 2a attached past the tag interrogator 4 using a forklift at a speed of 10 mph with the tagged item lifted off the floor at a distance or 6 feet from the interrogator 4. (2) the technician then activates a button (not shown) on the tag evaluation module 10 to mark that the forklift is in position, and then proceeds with the operations required for the test. (3) The tag evaluation module 10 then logs the data as described above along with the test number of the current sequence. (4) The technician is then alerted via the tag interrogator module 4 or the PC 20 when that test is complete, and presses the mark button on the tag evaluation monitor to acknowledge. New test instructions are displayed as per step (1) and all the steps repeated until all the test in the test sequences have been executed.

In the preferred embodiment, the tag evaluation module 10 (i.e. the controller stage 12) is suitably programmed to keep one or more logs of the voltage levels (i.e. signal $T_{pwp}$ on probe 9c) on the tag 2a during the running of the tests. The voltage levels are preferably recorded at a regular timed interval. The interval timing is extended If the voltages on the chip are below operating levels, then it is preferable to extend the timing interval. As the normal operating levels are approached, the timing interval is again shortened to reduce data storage requirements.

In the preferred embodiment, the tag evaluation module 10 (i.e. the controller stage 12) is suitably programmed to generate one or more logs of the data received by the tag 2a together with loge of the data transmitted by the tag 2a to the tag interrogator 4. These logs are then correlated to the logs of the tag is voltage. This information is useful in that it gives the error rate for communications to the tag 2a. In addition, it provides a measure of the window of opportunity for the RFID system 1 to communicate with the tag 2a under actual operating conditions.

The logs generated by the controller stage 12 in the tag evaluation module 10 as described above provide information which is used to quantify changes in performance of the RFID system 1, for example, due to multiple tags being present simultaneously in the field, or proximity of tags, or the effect of tagging of various materials. As will be familiar to those skilled in the art, many types of materials can reduce the effectiveness of the RFID system, such as fruits which contain high contents of water which absorbs radio frequency energy at high frequencies. Interferences of this type are not normally tested in a lab. However, the tag evaluation module 10 according to the invention makes it possible to tag such products in an installation and observe the effects of the actual products on the performance of the RFID system 1.

In summary, the RFID survey tool according to the present invention provides the following advantages. First, the RFID survey tool reduces the cost of site evaluations. Secondly, the RFID survey tool increases the accuracy of the results and reduces the time required to evaluate the site. Thirdly, the RFID survey tool aids in selecting antenna placement, evaluating suitability of tag to the material being tagged, and highlighting any marginal areas in the system. The RFID system is also suitable for diagnosing existing RFID tag installations.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. An apparatus for evaluating a radio frequency identification system having a plurality of tags, said tags operating at a selected frequency, and said tags being responsive to an output signal transmitted by an interrogator and each of said tags including a circuit for receiving the output signal transmitted by the interrogator and transmitting a return signal in response to said output signal, said apparatus comprising:
    (a) a probe for coupling to the circuit in one of said tags, and said probe including a plurality of lines for sampling selected signals in said circuit;
    (b) a controller coupled to said probe and including a processor for processing said sampled signals and memory for storing information associated with said sampled signals; and
    (c) a transmitter coupled to said controller and responsive to control signals from said controller for transmitting said stored information to a remote device, wherein said transmitter utilizes a communication channel operating at a different frequency than the selected frequency for the tags.

2. The apparatus as claimed in claim 1, wherein said communication channel comprises a radio frequency channel.

3. The apparatus as claimed in claim 1, wherein one of said sampled signals comprises a power reading for said tag.

4. The apparatus as claimed in claim 3, wherein one of said sampled signals comprises a data signal from said tag.

5. The apparatus as claimed in claim 4, wherein one of said sampled signals comprises a gap reading for the tag.

6. The apparatus as claimed in claim 2, Wherein said processor includes means for staring a plurality of said power readings and means for generating a power reading log, said power reading log being adapted for transmission to said remote device.

7. The apparatus as claimed in claim 4, wherein said processor includes means for storing a plurality of said data signals and means for generating a data log, said data log being adapted for transmission to said remote device.

8. The apparatus as claimed in claim 6, wherein said remote device comprises a computer, said computer having a communication link coupled to said interrogator and including means for comparing said power readings for said tag with power readings from said interrogator.

9. The apparatus as claimed in claim 7, wherein said remote device comprises a computer, said computer having a communication link to said interrogator and including means for comparing said data signals for said tag with data signals obtained from said interrogator.

10. The apparatus as claimed in claim 1, wherein said apparatus comprises a portable device powered by a battery supply.

11. An apparatus for evaluating a wireless system having a plurality of wireless terminals, said wireless terminals operating at a selected frequency, and said wireless terminals being responsive to an output signal transmitted by a transceiver terminal and each of said wireless terminals including a circuit for receiving the output signal transmitted by the transceiver terminal and transmitting a return signal in response to said output signal, said apparatus comprising:
    (a) a probe for coupling to the circuit in one of said wireless terminals, and said probe including a plurality of lines for sampling selected signals in said circuit;
    (b) a controller coupled to said probe and including a processor for processing said sampled signals and memory for storing information associated with said sampled signals; and
    (c) a transmitter coupled to said controller and responsive to control signals from said controller for transmitting said stored information to a remote device, wherein said transmitter utilizes a communication channel operating at a different frequency than the selected frequency for the wireless terminal.

12. The apparatus as claimed in claim 11, wherein said communication channel comprises a radio frequency channel.

13. A data signal embodied in a carrier wave, said data signal providing information from a tag under evaluation in a radio frequency identification system to a remote device, said radio frequency identification system including a plurality of tags operating at a selected frequency, and said tags being responsive to an output signal transmitted by an interrogator, said data signal comprising:
    (a) an envelope;
    (b) a data portion, said portion providing information about said tag under evaluation;

(c) wherein said carrier wave has a frequency different than the selected frequency of said tag under evaluation; and (d) said data portion including information related to a power level residing in said tag under evaluation.

14. The data signal as claimed in claim 13, wherein said data portion includes information related to data transmitted to said interrogator by said tag under evaluation.

15. The data signal as claimed in claim 13, wherein said data portion includes a log of power level readings obtained from said tag under evaluation.

16. The data signal as claimed in claim 13, wherein said data portion includes a log of data signals transmitted by said tag to said interrogator.

17. The data signal as claimed in claim 13, wherein said data portion includes information related to data transmitted by said interrogator to said tag under evaluation.

18. The data signal as claimed in claim 13, wherein said data portion includes a log of data signals received by said tag from said interrogator.

* * * * *